Jan. 3, 1939.  S. W. SPARKS  2,142,702
MANUFACTURE OF EXTRUDED METAL VALVES
Filed May 8, 1935  11 Sheets-Sheet 1

INVENTOR:
Stanley W. Sparks,
BY
His ATTORNEY.

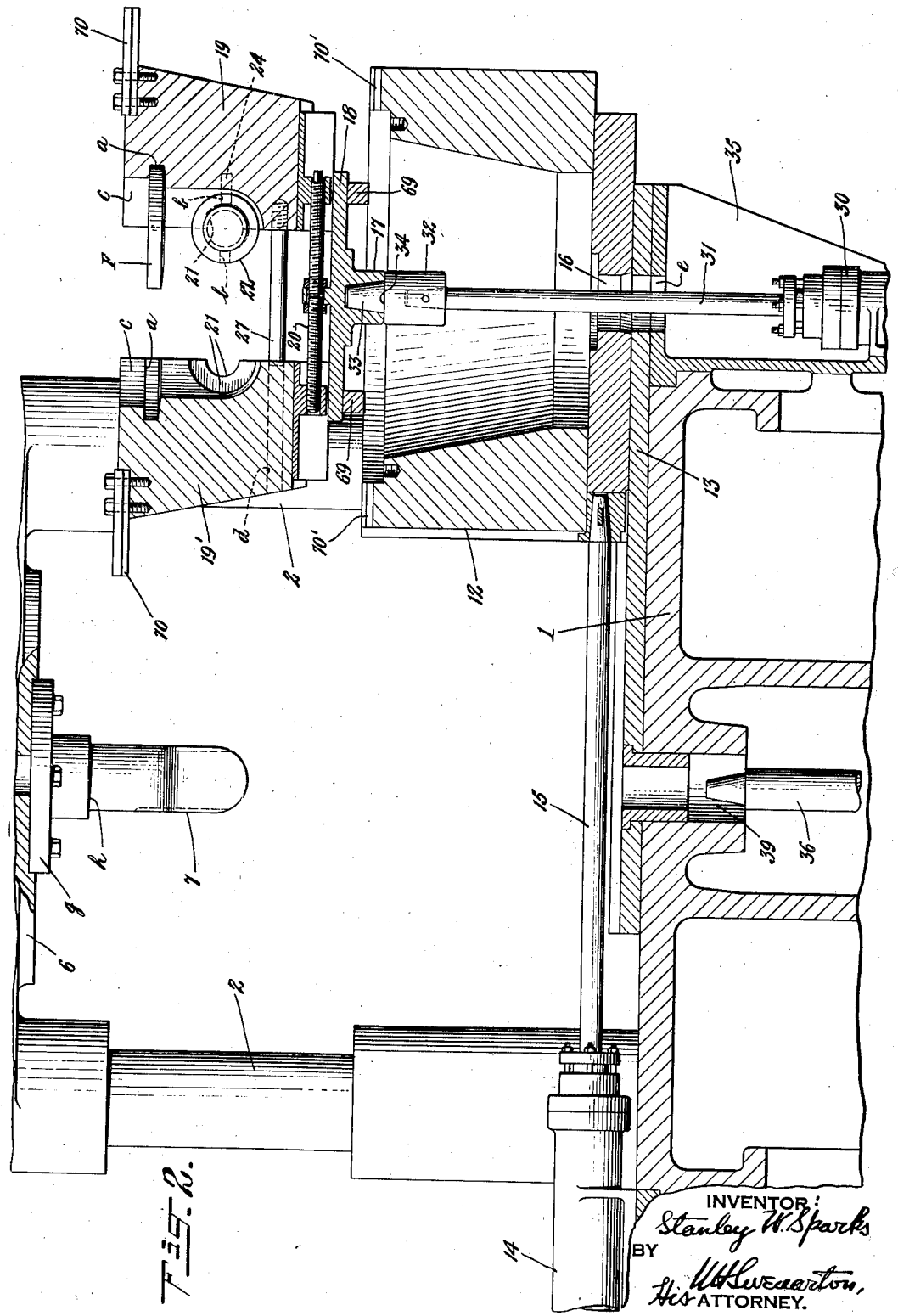

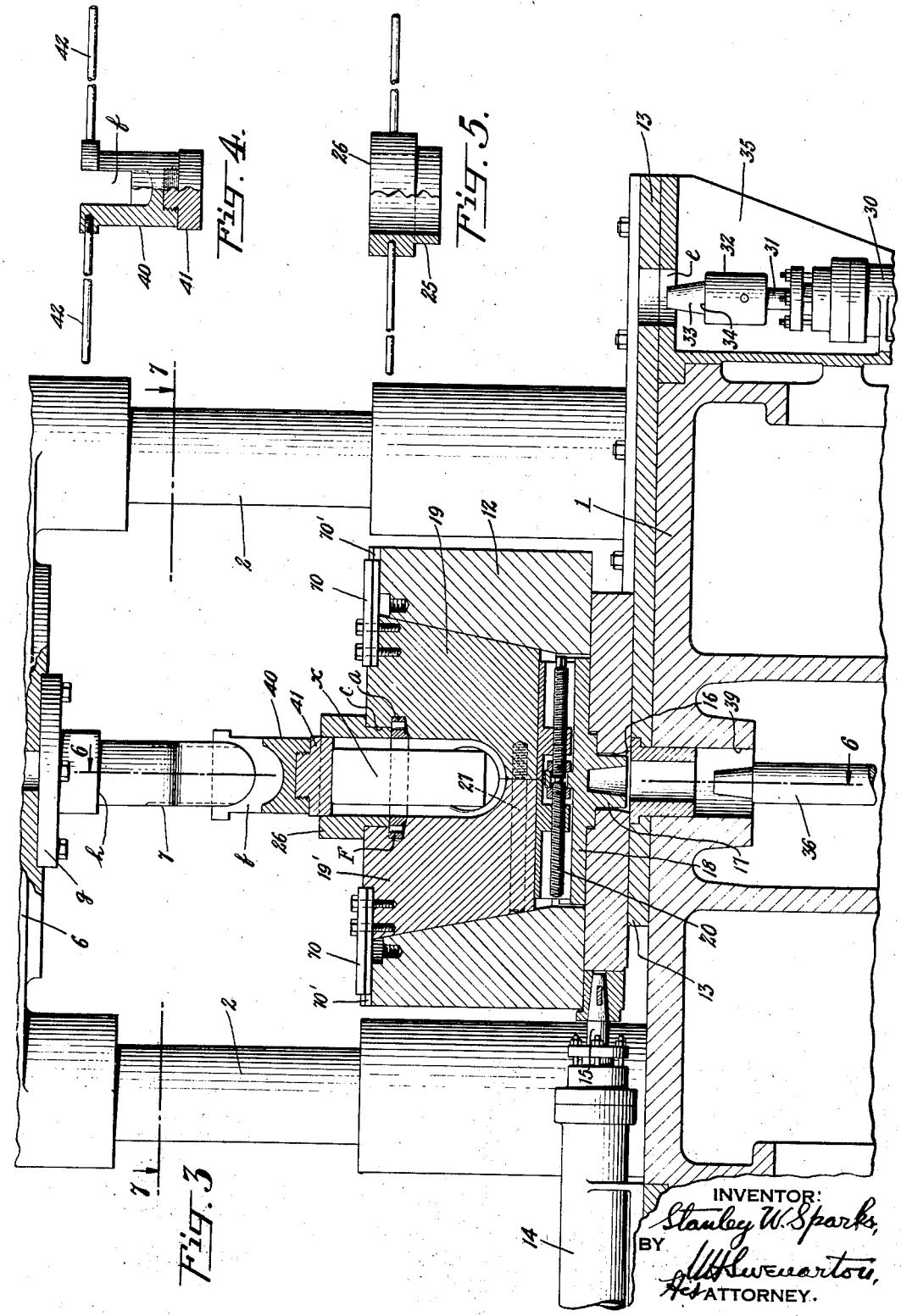

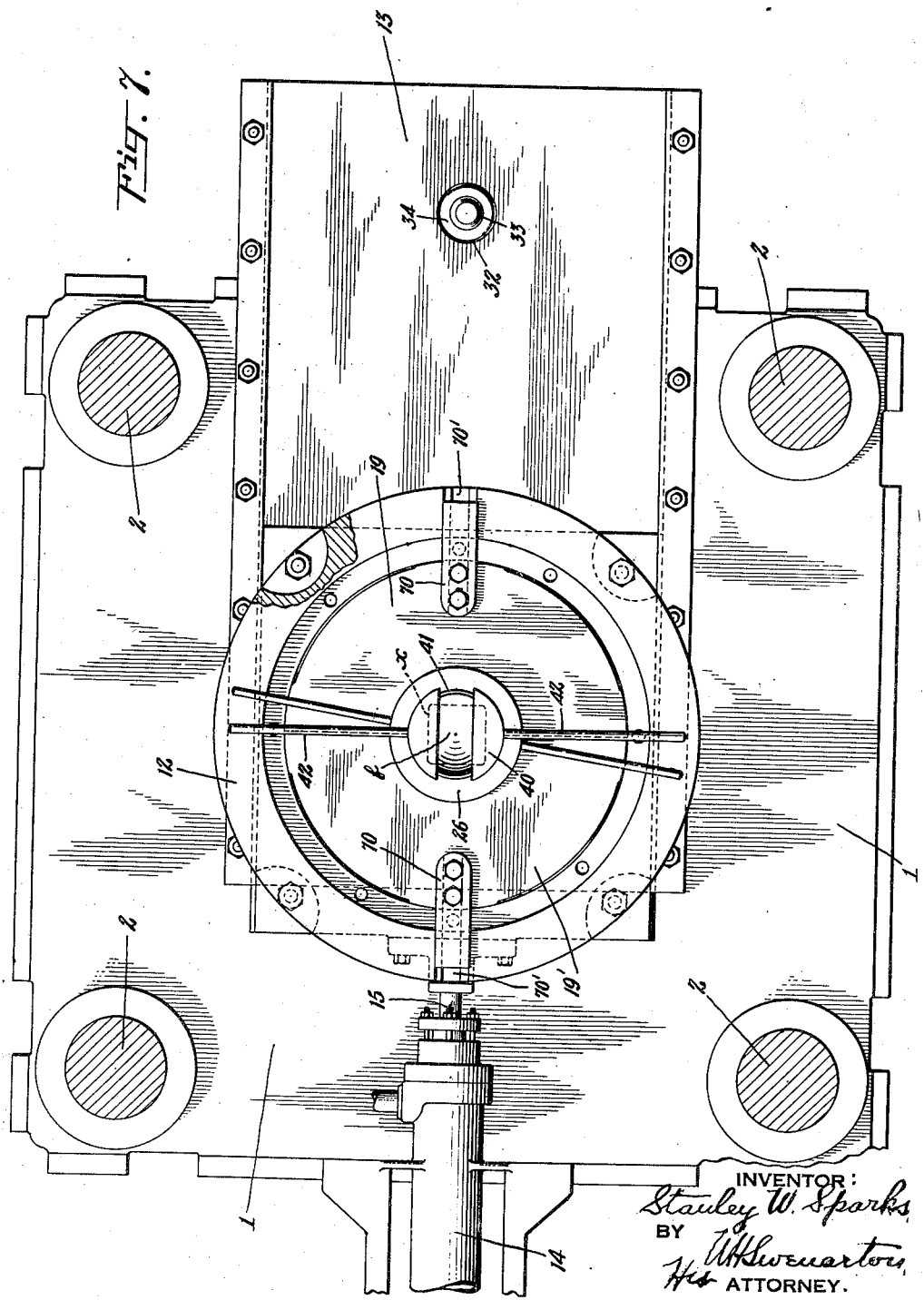

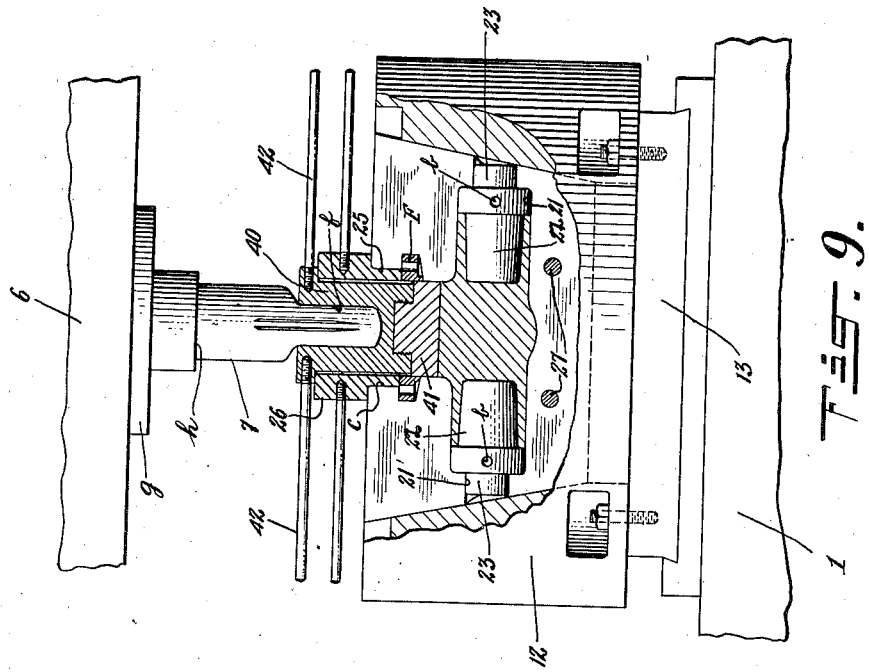
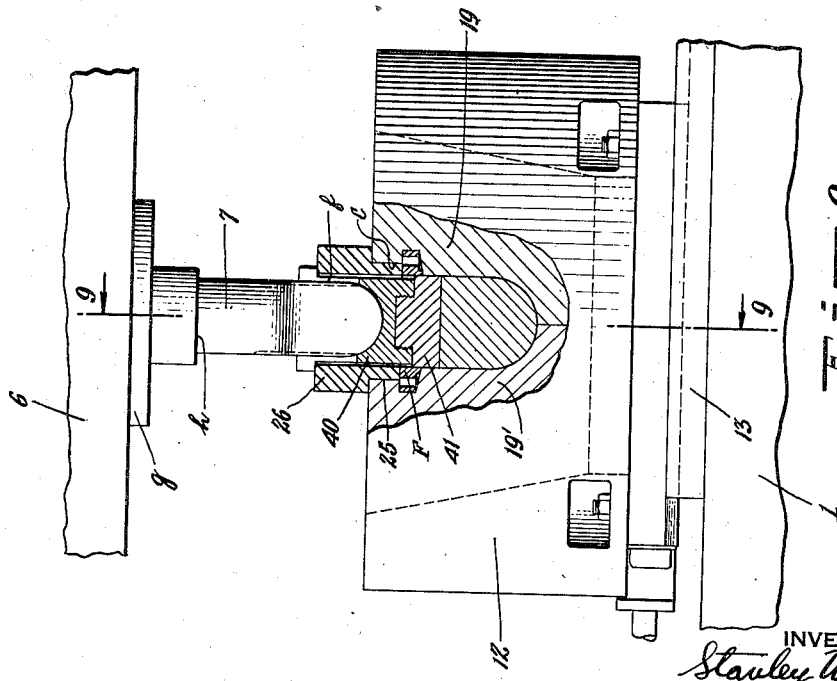

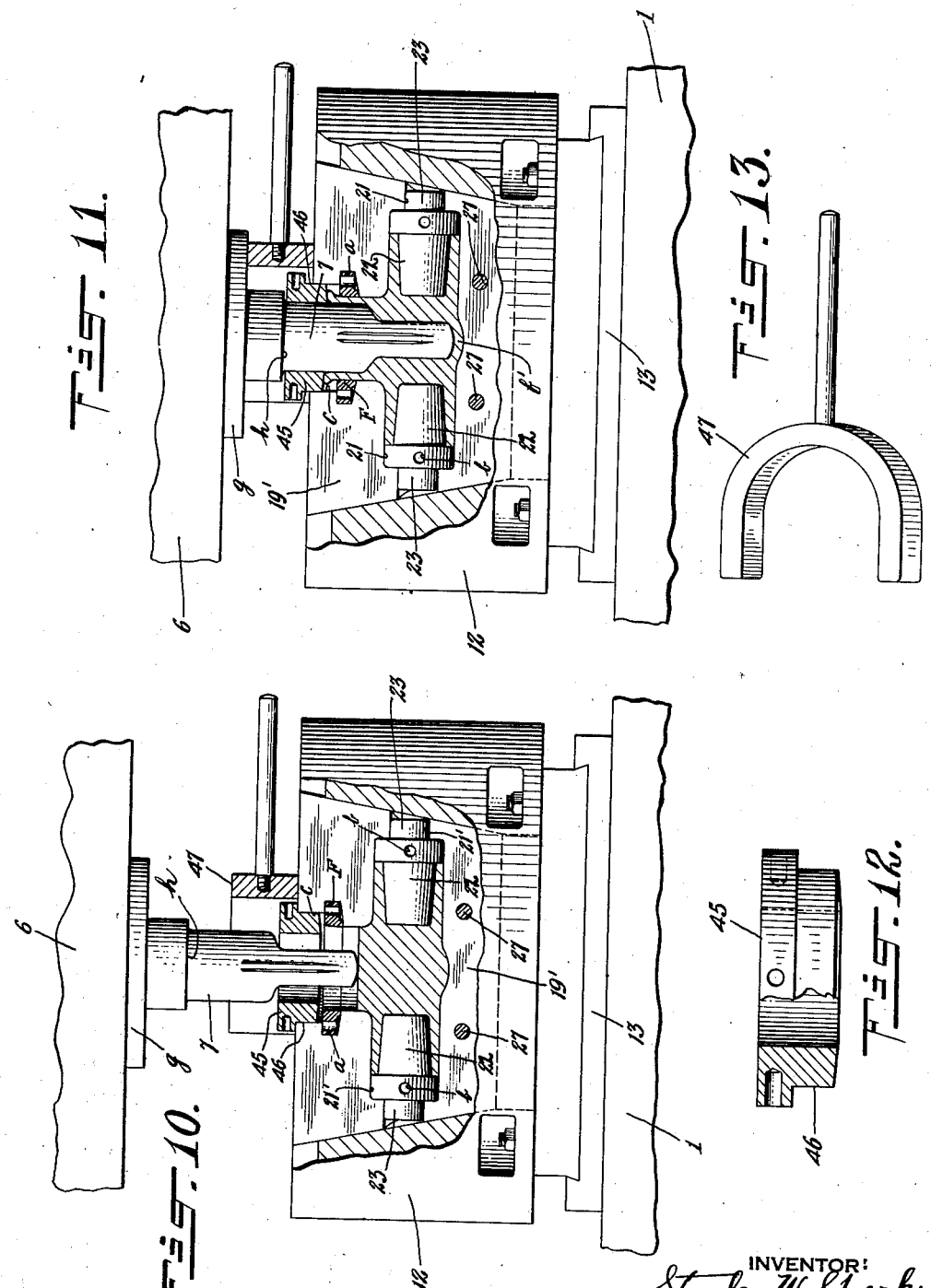

Jan. 3, 1939.     S. W. SPARKS     2,142,702
MANUFACTURE OF EXTRUDED METAL VALVES
Filed May 8, 1935     11 Sheets-Sheet 8
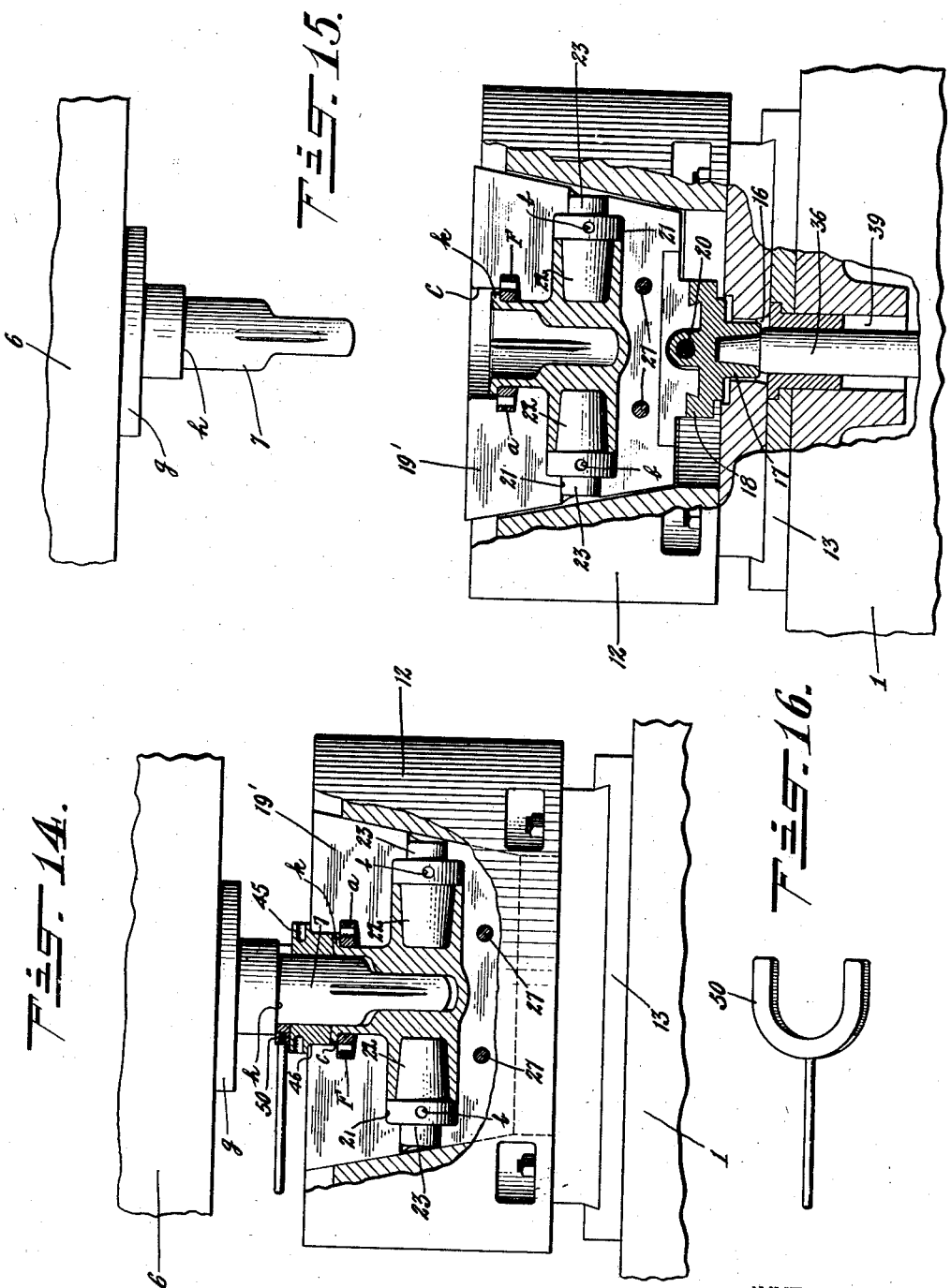

Jan. 3, 1939.    S. W. SPARKS    2,142,702
MANUFACTURE OF EXTRUDED METAL VALVES
Filed May 8, 1935    11 Sheets-Sheet 9
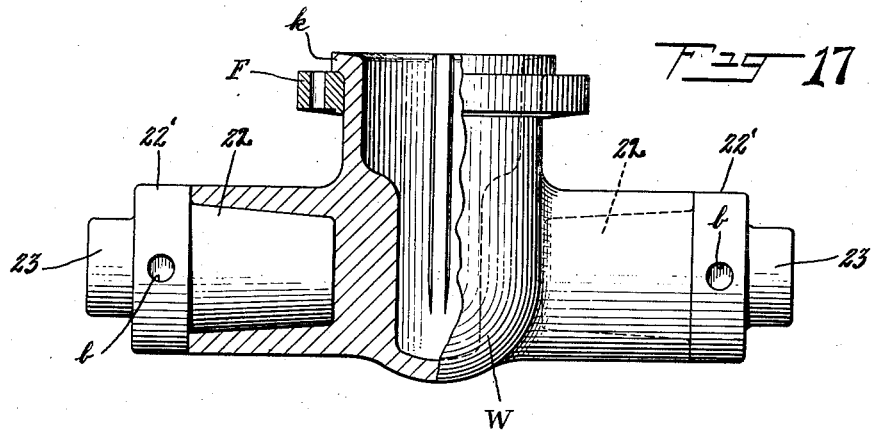
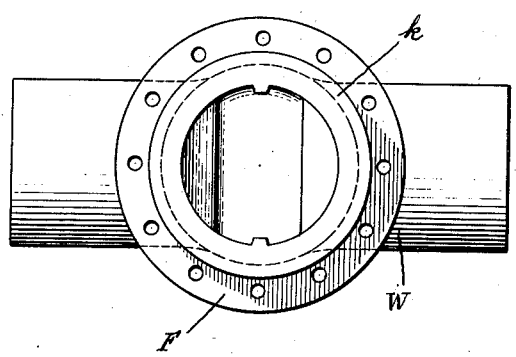
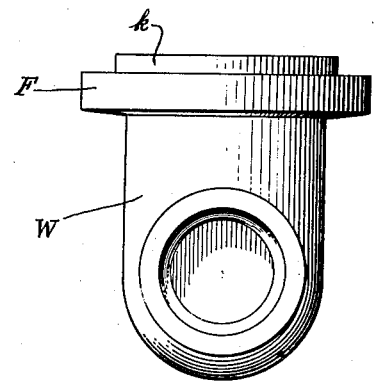
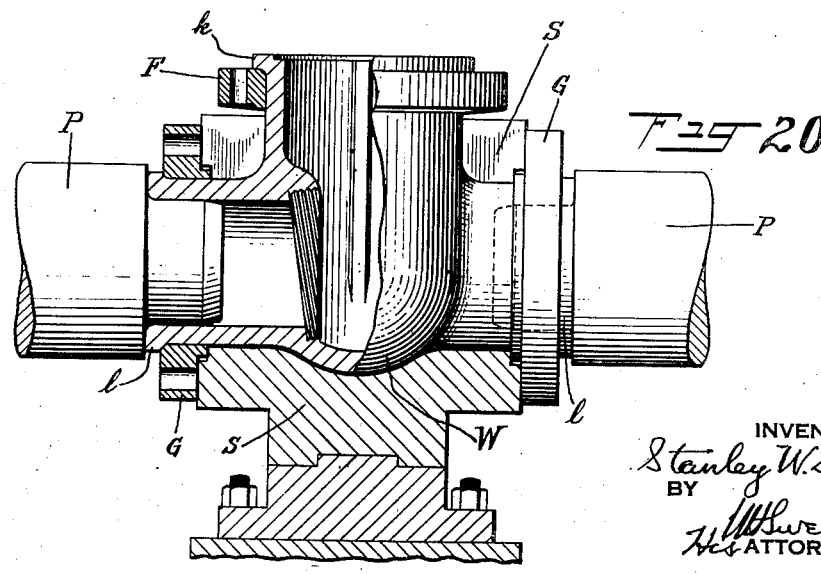
INVENTOR:
Stanley W. Sparks,
BY
HIS ATTORNEY

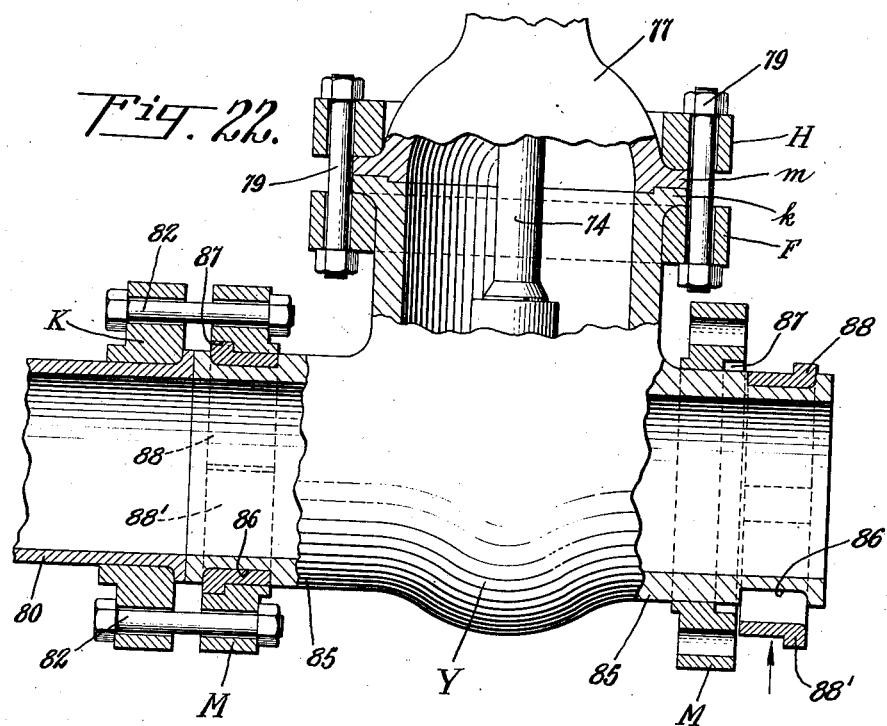
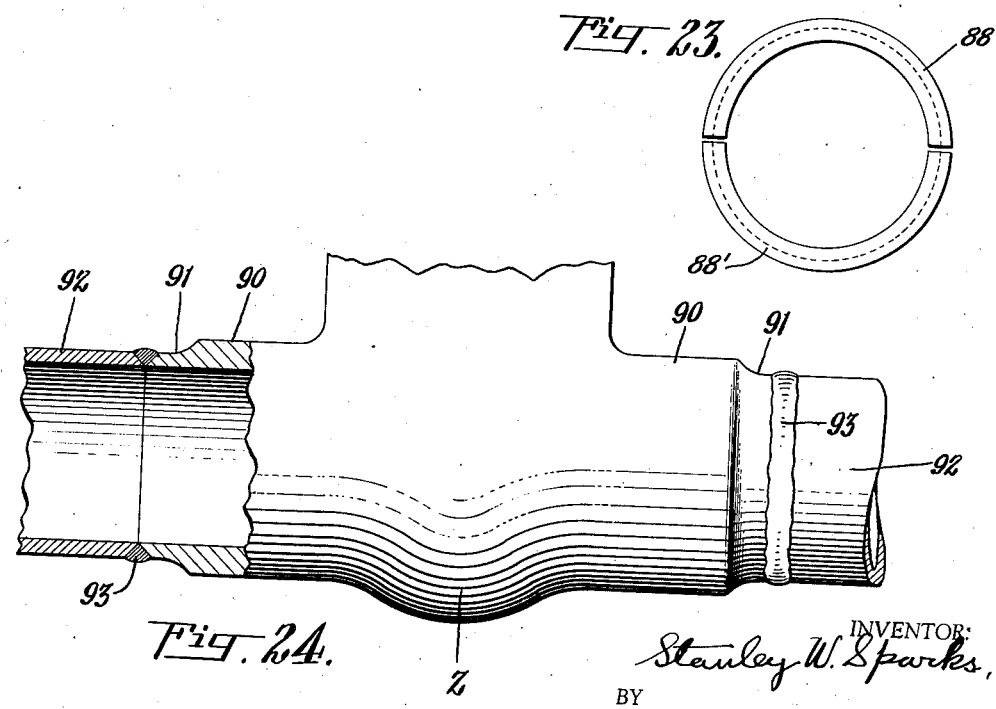

Patented Jan. 3, 1939

2,142,702

UNITED STATES PATENT OFFICE 2,142,702

MANUFACTURE OF EXTRUDED METAL VALVES

Stanley W. Sparks, Norwalk, Conn., assignor to Sparks Processes, Inc., Norwalk, Conn., a corporation of Connecticut Application May 8, 1935, Serial No. 20,315

8 Claims. (Cl. 29—157.1)

This invention relates to the manufacture of extruded, multi-way metal valves and more especially to those which are intended for high pressure and high temperature duty in refineries, power plants, chemical works and the like and has for its principal objects the expeditious and economical production of such valves wherein the hubs and the terminal seating faces thereof are formed integral with the body and the coupling flanges are independent, but permanently attached, and which valves are of considerably lighter weight than similar cast metal valves of the same classification. Other advantages of my invention are hereinafter set forth.

Heretofore, as I am well aware, it has been proposed to form an integral coupling flange on the body proper of a valve by an upsetting or rolling operation performed on the valve body after the same has otherwise been completely shaped with the exception of such flange. However, it is impossible, by any known upsetting method, to form a satisfactory integral coupling flange on the body of a valve where such valve is required to be of light weight, but sufficiently strong to be suitable for heavy duty in refineries and the like owing to the fact that, as is well recognized in forging practice, the thickness of any such upset terminal flange must not exceed approximately three times the original thickness of the metal from which such flange was formed or otherwise serious imperfections in the flanges will be developed in the upsetting operation. In the case of wrought iron, even the aforesaid rule of three to one is excessive.

Furthermore, I am also aware that, as set forth in Patent No. 869,340, it has been proposed to provide a pipe fitting with so-called Van Stone flanges secured thereon by retaining collars, and which fitting had an integral line member formed on the body proper to which was externally applied a separate saddle member, the abutting edges of which were subsequently welded together. Such construction, however, differs radically from my herein described improved valve construction and does not possess the many advantages thereof.

My investigations have led to the discovery that an extruded valve construction, having independent, but permanently attached coupling flanges, which is of homogeneous wall texture, of remarkable strength and yet of relatively light weight, and which is not susceptible to objectionable distortion or permanent set under high temperature and pressure duty, can be expeditiously and economically manufactured, provided the same is constructed in the manner hereinafter set forth in detail in the following description and drawings forming a part of this specification, in which latter Figure 1 is a front elevation of a hydraulic press equipment suitable for use in carrying out my improved method;

Figs. 2 and 3 are vertical sections, partly in elevation, of a portion of the apparatus shown in Fig. 1, showing the parts thereof in a charging position and a fully charged position, respectively;

Figs. 4 and 5 are front elevations, partly in section, of the respective primary extrusion tool or forging block and guide bushing employed, isolated;

Fig. 7 is a plan view on the line 7—7 of Fig. 3, the plunger element being omitted;

Fig. 8 is a fragmentary front elevation, partly in section, of the die-pot showing the position of the parts at the completion of the first pressure stroke of the ram; and Fig. 9 is a vertical section on the line 9—9 of Fig. 8;

Figs. 10 and 11 are fragmentary side elevations, partly in section, showing the position of the parts immediately prior to the commencement of the body-chamber, extrusion stroke and at the completion of such stroke, respectively;

Fig. 12 is an elevation, partly in section, of the flaring bushing which is employed during the said body chamber extrusion stroke and Fig. 13 is a perspective view of the stop yoke employed in this stage of the operation;

Fig. 14 is a vertical section, partly in elevation, of the parts at the moment of completion of the body forging; and Fig. 15 is a similar view showing the forming tool withdrawn from the die-pot to its top position;

Fig. 16 is a perspective view of the stop yoke employed in the flaring operation, isolated;

Fig. 17 is an elevation, partly in section, of the finished body forging removed from the die and still carrying the fluid-way forming plugs;

Fig. 18 is a plan view and Fig. 19 an end elevation of the finished body forging with the fluidway forming plugs removed;

Fig. 20 is an elevation, partly in section, of the finished valve body; and

Fig. 22 is an elevation, partly broken away of a modified form of valve wherein flanged sectional retaining rings are employed for locking the coupling flanges to the hub members;

Figure 1:
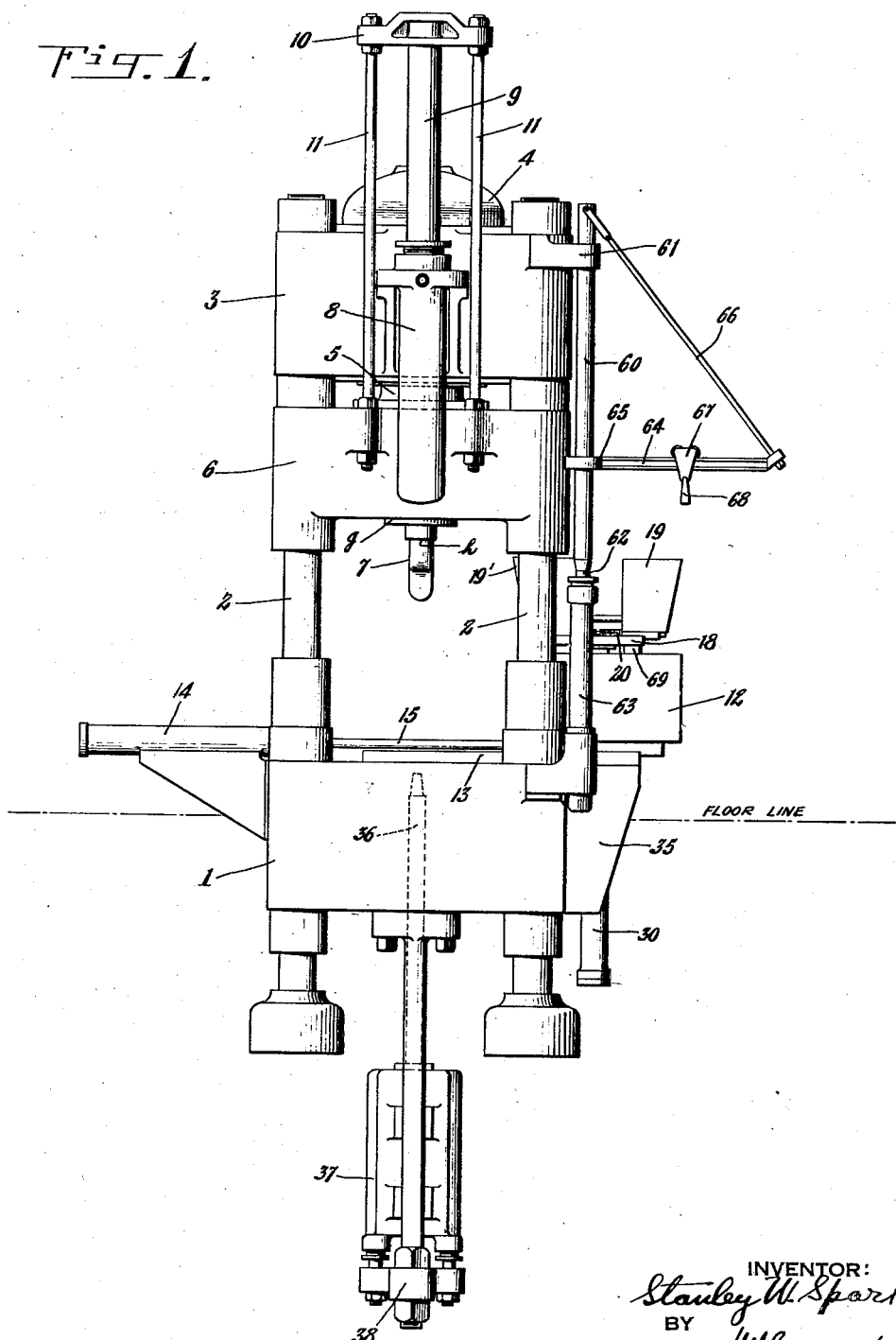
Figure 6:
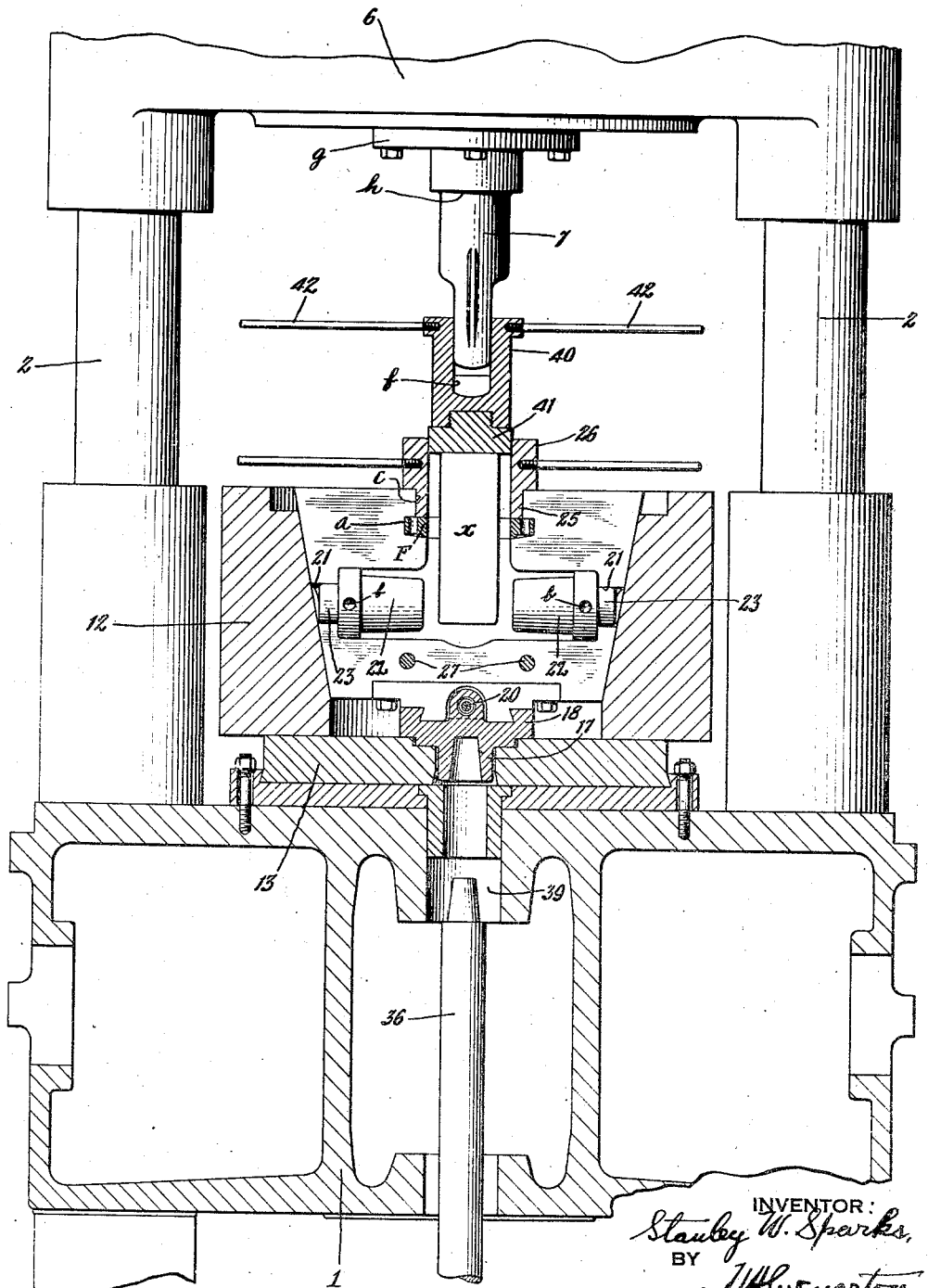
Fig. 6 is a fragmentary vertical section, partly in elevation, on the line 6—6 of Fig. 3.

Fig. 23 is a plan view of one of the flanged sectional retaining rings employed in the construction shown in Fig. 22; and Fig. 24 is an elevation, partly broken away of still a further modification showing a valve generally similar to that shown in Fig. 22, except that in lieu of the hubs being provided with coupling flanges for securing the same to a pipe line, such hubs are intended to be directly united to the pipe sections by a welding operation.

Referring to the drawings and the construction shown therein, the reference numeral 1 designates the platen of the hydraulic press equipment of generally standard design which is specially adapted for producing my novel valve body forging, the same having columns 2 which support the main housing 3 in which is mounted the main cylinder 4. A ram element or plunger 5 reciprocates in said cylinder and to the lower end thereof is bolted a crosshead 6 that slides on said column 2. A forming tool 7 is bolted to the lower face of said crosshead and moves therewith. Drawback cylinders 8 are oppositely disposed on the front and rear of the press, the same being carried by said housing 3 (the rear cylinder not being visible in Fig. 1), and plungers 9, which are respectively mounted in said cylinders and carried by a supplemental crosshead 10 which is in turn connected to the cross head 6 by pull rods 11, serve to elevate the ram 5 and said crosshead 6, together with the forming tool carried thereby, when desired.

A die-pot 12 is slidably mounted on a table or plate 13 that is secured to said platen, the same being actuated by a hydraulic traverse cylinder 14 through its plunger element 15, which latter is connected to the bottom of said die-pot. The latter has a bottom counter-bored recess 16 which is adapted to receive a hollow shouldered boss 17 formed on the base 18 of a split die comprising two halves 19 and 19' that are slidably mounted on said base. A right and left hand screw 20, rotatably mounted on said base 18, serves in the well known manner for actuating said die members 19 and 19' and effects the opening or closing of the die as desired.

Each half of said split die has a semi-circular recess $a$ to receive half of an independent coupling flange F. Moreover hemi-cylindrical counter-bored apertures 21 are provided in each of these die members for the reception of fluidway forming plugs or drifts 22, each of which latter are of truncated cone-like configuration at their inner ends and have an intermediate shoulder portion 21' and cylindrical outer ends 23 of reduced cross-section. Each of said shoulders is oppositely recessed, as indicated by the reference letter $b$, to receive tip ends of charging tongs, not shown, and one of these recesses in each plug is adapted to receive one of two locating pins 24 provided on the die member 19, which pins serve to temporarily hold the plugs when the same are first introduced into the open die and prevent the accidental displacement thereof from the apertures 21 during the closing of the die. The die members are each shaped internally below the recesses $a$ to conform to the external configuration of the desired body forging to be formed therein. Above the recesses $a$ in each die member is a hemi-cylindrical recess $c$ which is adapted to snugly receive the lower end 25 of a primary guide and stop bushing 26. Elongated apertures $d$ are formed in the die member 19', which apertures are adapted to receive co-operating guide pins 27 carried by the other die member 19, said guide pins being of sufficient length to just penetrate into said apertures when the die members are in an open position (see Fig. 2), and when said dies are in a closed position, said guide pins project substantially throughout the entire length of the apertures $d$.

Below one end of the table 13 is mounted a cylinder 30 which is provided with a die-elevating plunger 31, the head 32 of which has a reduced end or truncated cone-like nose 33 and a shoulder 34, the latter being adapted to engage the lower end of the boss 17, and when said shoulder and said boss are engaged, said nose penetrates into the central recess of the said boss 17, but the upper end of said nose at no time will directly engage the extreme inner end of the said recess in the boss 17. The table 13 and the supporting bracket member 35 is provided with an aperture $e$ through which the head 32 of the plunger 31 is adapted to be projected, as desired, when the die-pot is in the position shown in Fig. 2. A vertically movable die-break-out ram 36, carried by a pair of vertically reciprocatable cylinders 37 that are carried by a crosshead 38, is caused to penetrate through a bushed aperture 39 in the platen and forcibly projected into the central aperture of the said hollow boss 17 when it is desired to break out the die from the die-pot at the completion of the forging operation.

A cylindrical primary extrusion tool 40, having a removable nose 41 which is centrally slotted, as indicated by the reference letter $f$ to receive the lower end of the forming tool 7, is provided with handles 42 for transporting and manipulating the same.

A shouldered bushing 45, the lower end 46 of which fits in the recesses $c$ of the closed die members, performs the dual function of guiding the forming tool 7 during the downward movement of same and for flaring the marginal wall of the body chamber. A chamber-forming stop yoke 47, which is adapted to be interposed between the base $g$ of the forming tool and the top of the die, limits the extent of downward movement of the forming tool, thereby defining the thickness of the bottom wall $f'$ of the body chamber as well as admitting of the slight elevation of the bushing 45 by the action of the extruded neck of metal displaced by said forming tool which projects above the top face of the flange F.

A second stop yoke 50, which is of considerably less height than the yoke 47, is adapted for insertion beneath the shoulder $h$ of the forming tool, following the removal of yoke 47 whereby, upon the next downward stroke of the plunger, the bottom end of the flaring bushing 45 will engage the said extruded neck portion of the body and effect the flaring or peening over the same to form a retaining collar $k$.

A billet-charging and forging delivery crane is mounted at the side of the press, the same comprising a mast 60, slidably mounted in a guide 61 formed on the housing 3, said mast being an extension of a plunger 62 that reciprocates in a hydraulic cylinder 63 mounted on the platen 1. Said mast carries a boom 64 which is secured at one of its ends to a collar 65 formed on said mast and which is supported at its outer end by the stay rod 66. A carriage 67 travels on said boom the same having two depending hooks 68 from which the tongs carrying the billet or the finished forging can be suspended during the introduction of the billet X into the die or during the delivery of the finished forging W therefrom. Supporting bars 69, which span the die-pot, are inserted beneath the base of the die after the die is elevated out of the die-pot (see Fig. 2), such bars being removed when it is desired to lower the charged and closed die into the die-pot.

In order to maintain a predetermined alinement of the closed die and die-pot, the respective die members 19, 19' are provided with projecting positioning lugs 70 that are bolted thereto and adapted to enter opposing co-operating guide slots 70' formed in the top of the die-pot (see Fig. 7) when the closed die is lowered thereinto and thereby prevent any possible rotary movement of the closed die within the die-pot during the different stages of the extrusion operation.

The valve body forging W which is recovered from the die, (see Figs. 17 and 19), has the hub thereof also equipped in the manner hereinafter described, with flanges of the Van Stone type, as designated by the reference letter G, the same being retained thereon by integral terminal collars I. Valve seats 71, which are provided with projecting lugs 72 that admit of the same being manipulated by a suitable spanner wrench, are threaded into the tapped recesses 73 formed in the body. A valve stem 74, which carries a gate 75 and is manipulated by a handle 76, is mounted in a bonnet member 77. The latter also is provided with coupling flanges H of the Van Stone type, the same being retained thereon by integral terminal collars m. The respective flanges F and H of the valve body and the bonnet are bolted together by means of bolts 79.

Figure 21:
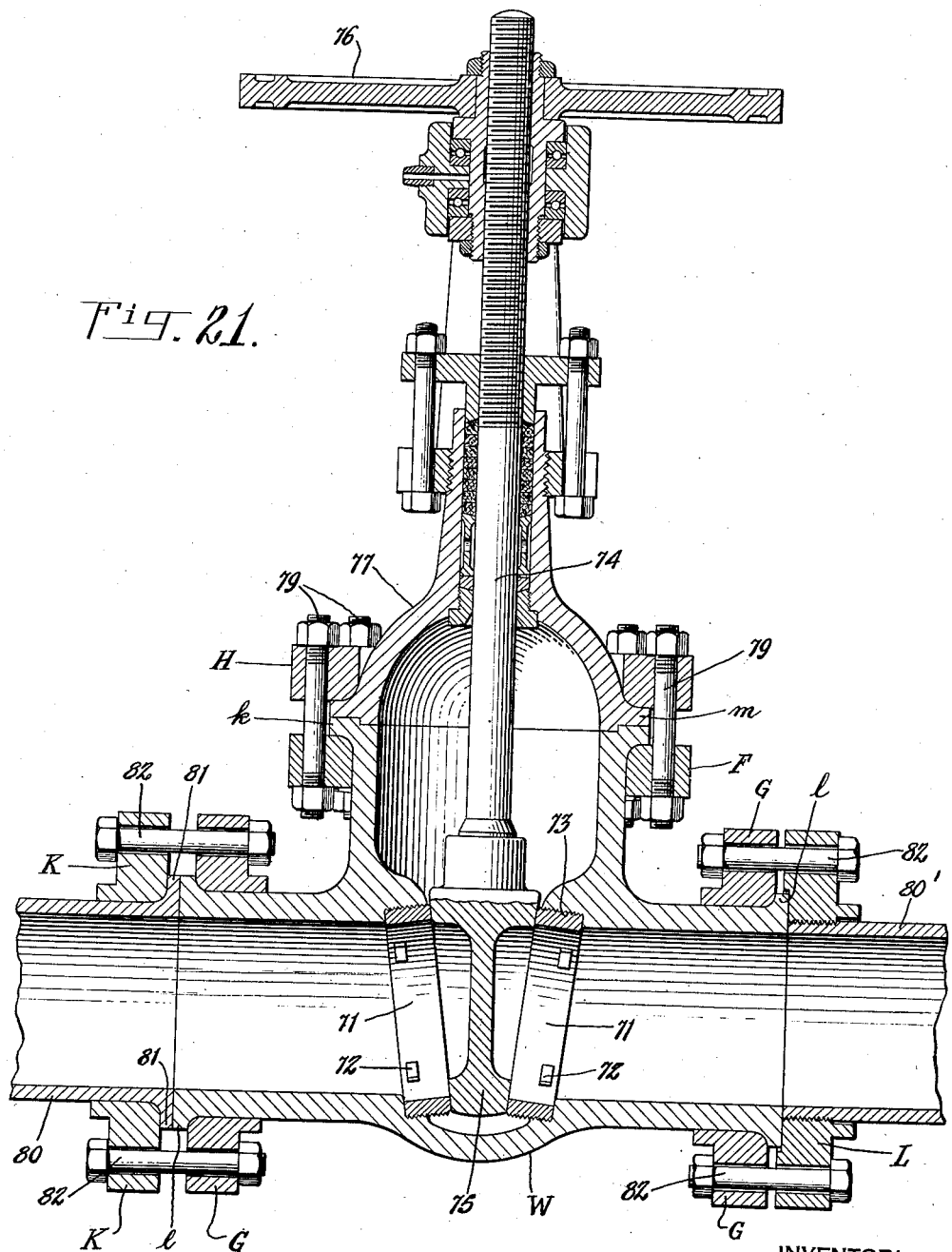
Fig. 21 is a vertical section of a complete valve embodying my invention showing the manner of coupling same to a pipe also equipped with Van Stone flanges.

As shown in Fig. 21 my improved valve, by virtue of the fact that the hubs thereof are equipped with flanges of the Van Stone type is ideally adapted to be connected with the pipe line, such as indicated by the reference numeral 80, that is also equipped with a Van Stone type of flange, as indicated by the reference letter K, the same being retained by the integral collar 81. Bolts 82, that are inserted through registering apertures in the respective flanges G and K, serve to maintain the fluid-tight fit between abutting machined faces of the integral retaining collars on the valve and the adjacent line pipe.

In carrying out the production of a valve body forging, such as the forging W, in my improved apparatus, the parts are first positioned as shown in Figs. 1 and 2, the fluid-way forming plugs 22 are inserted through the top of the open die into the respective apertures 21 of the die members 19, 19', in such a manner that the locating pin 24 of each die member projects into one of the recesses b of the particular plug so inserted in said die member. The coupling flange F is then positioned in the co-operating recess a of the die member 19 (see Fig. 2). The die is then closed by means of a wrench applied to one end of the screw 20.

An elongated billet X, of square cross-section and of a cubical content equal to that of the desired valve body forging and which is supported by tongs from the hook 68, is then lowered into the closed die by retracting the plunger 62, to lower the mast 60 and the boom 64 carried thereby. The plunger 31 is then elevated sufficiently to admit of the withdrawal of the supporting bars 69 from beneath the bottom of the die and then the plunger 31 is retracted to lower the closed die into the die-pot 12, which latter is slidably mounted in the guides carried by the table 13.

The primary guide and stop bushing 26 is then introduced into the closed die and the primary extrusion tool is then inserted in said bushing so that the same rests on the top of the billet X and then the die-pot is traversed across the table 13, by the plunger 15, into a central position beneath the crosshead 6. Thereupon the crosshead carrying the forming tool 7, which as shown is so mounted that the major transverse axis of its reduced lower end is in alinement with the longitudinal axis of the slot f in the extrusion tool 40, is caused to move downwardly by pressure exerted thereon by the ram 5 and the forming tool which then enters the slot f of the extrusion tool is caused to move downwardly and impel the extrusion tool 40 against the billet X and extrude the same, in the same manner shown in Fig. 9, wherein the central portion of the mass of metal so extruded is solid and of sufficient cubical content to completely form hollow hub members, except for the flaring of the ends thereof to form retaining collars and to admit of the formation of the body proper by a subsequent invert extrusion operation.

The ram 5 is then retracted into its cylinder to elevate the forming tool 7 out of the die, the extrusion tool 40 and the primary guide and stop bushing 26 are removed from the die and the bushing 45 is then inserted into the die in such a manner that its lower end rests against the flange F. The stop yoke 47 is then interposed between the base g of the forming tool and the top of the closing die (see Fig. 10). The ram is then caused to descend so as to project the forming tool into the die and into the position shown in Fig. 11, whereupon further downward movement of said forming tool will be supported by the yoke 47 as previously explained and the bushing 45 will be forced upwardly by the extruded neck of metal until the same engages the shoulder h of the forming tool. Thereupon the ram is again elevated sufficiently to admit of the removal of the yoke 47 and the insertion of the relatively thin yoke 50 between the top of the elevated bushing 45 and the shoulder h. The ram is then caused to descend and the flaring of the extruded neck of the body portion into terminal collars k is thereby effected by means of the engagement of the chamfered lower end of the bushing 45 with the said neck of metal. The ram is now again elevated in the position shown in Fig. 15, and the die is broken away from the die-pot by actuating the die back into the ram 36 (see Fig. 15) and then said ram 36 is lowered in the position shown in Fig. 2. The die-pot is then traversed to the right by means of the plunger element 15 and its cylinder 14 until it retains the position shown in Fig. 2 and then the die is elevated out of the die-pot by means of the elevating plunger 31, the die is opened by actuating the screw 20 and the finished forging W removed while still carrying the plugs 22 and removed from the open die by means of the crane in the manner aforesaid. The plugs are then removed from the forging W and a terminal collar k is machined to form a terminal sealing face and then coupling flanges G are respectively applied to the hubs of the forging W and the latter is inserted in a split-supporting die S. The extreme ends of the hub are then locally heated by means of a torch or otherwise to a sufficient temperature to admit of the flaring thereof and the flaring tool P having reduced outer ends which serve to support the hub walls and prevent the collapse or buckling thereof during the flaring operation, are then caused to effect the flaring of the ends of the hubs to form terminal collars $l$, which collars permanently lock the flanges G to said hubs. The finished valve body X is then removed from the die S and the end faces of the collars $l$ are machined to form a sealing face.

In the production of the valve Y shown in Fig. 22, wherein the flanges are secured to the hubs by means of flanged segmental retaining rings, a valve body forging, similar to the forging W shown in Figs. 17 and 19 is first produced in the manner heretofore described, except that in lieu of the subsequent flaring of the ends of the hubs to form integral terminal collars $l$, the hubs 85 are machined adjacent, but not at, the extreme ends thereof, to form annular grooves 86 and the coupling flanges M which are counterbored to form an annular recess 87 on the outer faces thereof are slipped over the ends of the hubs and positioned first as shown at the right of Fig. 22, and then flanged segmental retaining rings, each comprising two sections 88 and 88', are manually fitted into the said grooves, the same being positioned as shown at the left of Fig. 22. The flanges M are then forced outwardly over said segmental rings and into the position shown at the left of Fig. 22, in which position the inner face of the flanges of each segmental ring will engage the bottom of the respective recesses 87 while the outer end of each of these rings will engage the outer walls of the respective hub grooves 86, thereby locking the coupling flanges M to the hubs just as effectively and positively as the flanges G are locked to their respective hubs by the terminal collars $l$ in the valve construction shown in Figs. 20 and 21. As will be apparent, owing to the greater wall thickness of the hubs 85 as compared to the pipe 80, both the flanges G and M must be formed of greater internal cross section than the cooperating Van Stone flanges K carried by the pipe 80 in order to insure that the bolt-receiving apertures of the flanges G and M will register with the bolt-receiving apertures of the flanges K and admit of the insertion of the bolts 82 therethrough.

In the valve construction shown in Fig. 24, the body proper of the valve Z is essentially similar to the body proper of the valve Y shown in Fig. 22, but in lieu of providing the hubs with independent, but positively attached flanges, such as the flanges M, the outer ends of the hubs 90 are machined so as to reduce the wall section thereof to correspond to the wall section of the connecting pipe 92, which admits of the same being welded together as shown. In order to increase the bond between the fillet weld 93 and the adjacent surfaces of a hub and its connecting pipe, both the end of each hub and the abutting end of the pipe are faced off or chamfered to form an oblique face. The body proper of this valve is provided with a separate, but applied, flange similar to that carried by the body Y shown in Fig. 22. Since it is of the utmost importance that the bonnet be removable in order to admit of access to the valve chamber and to the seats when it is desired to reface the valve seats or repack the stem, the valve Y is provided with a body flange F which is applied thereto in the same manner as the flange F is applied to the body of the valve body forging W shown in Fig. 21.

The wall of my improved valve is of uniform thickness and remarkably homogeneous in texture throughout and obviously is unusually free from gas pockets or other defects or imperfections owing to the thorough working of the metal during the extrusion of the body forging. Furthermore, because of the unusual strength of the walls, it is possible to employ a valve body of this type whose walls are of considerably less thickness than a cast steel valve of the same pressure specifications.

This extruded valve shown in Fig. 24 is, unlike cast steel pipe, ideally adapted to be welded to seamless pipe made by the so-called Mannesman and other rolling operations, as well as to extruded pipe, since there are no objectionable stresses set up adjacent the weld because of any undue similarity between the texture of the metal of the pipe and of the hubs to which the same is welded.

My improved apparatus is especially designed for use with standard hydraulic presses without necessitating extensive alterations therein.

Various changes and modifications in the construction of the valve body forging and the method and apparatus herein described may be made without departing from the scope of my invention as embraced within the scope of the appended claims.

Having thus described my invention, what I claim and desire to obtain by United States Letters Patent is:—

1. The method of making a valve body forging, which comprises introducing an elongated, hot metal blank, while in a plastic condition, into a split die of the same general internal configuration, when closed, as that of the external configuration of the desired valve body forging, and therein directly extruding the same in such a manner as to simultaneously effect the longitudinal contraction and lateral expansion thereof, then effecting the outward expansion of the central portion of the partially forged blank through a separate flanged insert member positioned in the die and subsequently flaring the upper end of the body to permanently lock such flange thereon.

2. The method of making a valve body forging, which comprises introducing an elongated, hot metal blank, while in a plastic condition, into a split die of the same general internal configuration, when closed, as that of the external configuration of the desired valve body forging, and therein directly extruding the blank in such a manner as to simultaneously effect the longitudinal contraction and lateral expansion thereof, then effecting the outward expansion of the central portion of the partially forged blank through a separate flanged insert member positioned in the die, then flaring the upper end of the body to permanently lock such flange thereon, then positioning coupling flanges on the respective hub members of the resultant forging in a position adjacent to but a small distance from the ends of such hubs, and then locking the said flanges thereon by flaring the extreme outer ends of the hubs beyond said flanges.

3. The method of making a valve body forging, which comprises introducing an elongated, hot metal blank, while in a plastic condition, into a split die of the same general internal configuration, when closed, as that of the external configuration of the desired valve body forging and therein effecting the direct extrusion of the blank in such a manner as to simultaneously effect the longitudinal contraction and lateral expansion thereof around fluid-way forming plugs thereby forming opposing hub members, then effecting by extrusion, the outward expansion of the central portion of the partially forged blank around a forming arbor and effecting the formation of the body chamber and then applying to said hubs flanging means suitable for coupling the same to a pipe line and then permanently locking said flanging means to the said hubs by upsetting the ends of the latter.

4. The method of making a valve body forging, which comprises introducing an elongated metal blank, while heated to a plastic condition, into a split die of the same general internal configuration, when closed, as that of the external configuration of the desired valve body forging, and therein directly extruding the same in such a manner as to simultaneously effect the longitudinal contraction and lateral expansion thereof around fluid-way forming plugs, then effecting the outward expansion of the central portion of the partially forged blank through a separate flanged insert member positioned in the die and subsequently flaring the upper end of the body to permanently lock such flange thereon.

5. The method of making a valve body which comprises introducing a heated metal blank to a die of the desired configuration, and therein directly extruding the same to form a body with extruded hubs and extruded fluid-ways in the hubs; effecting the outward movement of the metal blank through a separate flange insert member positioned in the die and initially clear of said blank at the beginning of said outward movement; and flaring the upper end of the body to lock the flange member thereon.

6. The method of making a valve body which comprises introducing a heated metal blank to a die of the desired configuration, and therein directly extruding the same to form a body with extruded hubs and extruded fluid-ways in the hubs; effecting the outward movement of the metal blank through a separate flange insert member positioned in the die and initially clear of said blank at the beginning of said outward movement; flaring the upper end of the body to lock the flange member thereon; and fitting flanges on each of said hubs in such a manner that the free ends of the hubs project outwardly beyond the outer faces of such applied flanges and flaring the outer ends of the hubs to form flange retaining collars.

7. The method of making a valve body which comprises introducing a heated metal blank to a die of the desired configuration, and therein directly extruding the same to form a body with at least one extruded hub and extruded fluid-way in the hub; effecting outward movement of the metal blank through a separate flange insert member positioned in the die and initially clear of said blank at the beginning of said outward movement; and flaring the upper end of the body to lock the flange member thereon.

8. The method of making a valve body which comprises introducing a heated metal blank to a die of the desired configuration, and therein directly extruding the same to form a body with at least one extruded hub and extruded fluid-way in the hub; effecting outward movement of the metal blank through a separate flange insert member positioned in the die and initially clear of said blank at the beginning of said outward movement; flaring the upper end of the body to lock the flange member thereon; and fitting a flange on said hub in such a manner that the free end thereof projects outwardly beyond the outer face of such applied flange, and flaring the outer end of the hub to form a flange retaining collar.

STANLEY W. SPARKS.